United States Patent
Roy-Faderman et al.

(10) Patent No.: US 10,585,658 B2
(45) Date of Patent: *Mar. 10, 2020

(54) ARCHITECTURES AND TECHNIQUES FOR RECORD PROTECTION AND FIELD MANAGEMENT

(71) Applicant: salesforce.com, inc., San Francisco, CA (US)

(72) Inventors: Avrom Irwin Roy-Faderman, Sunnyvale, CA (US); Jean-Baptiste Pringuey, San Mateo, CA (US); Haripriya Murthy, Fremont, CA (US); Sricharan Anand Ramanujapuram, Fremont, CA (US); Christopher A. Kohr, Orinda, CA (US); Aaron Slettehaugh, San Ramon, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,111

(22) Filed: Oct. 29, 2018

(65) Prior Publication Data

US 2019/0065169 A1 Feb. 28, 2019

Related U.S. Application Data

(63) Continuation of application No. 15/164,781, filed on May 25, 2016, now Pat. No. 10,114,628.

(51) Int. Cl.
*G06F 8/61* (2018.01)
*G06F 21/62* (2013.01)
(Continued)

(52) U.S. Cl.
CPC .............. *G06F 8/61* (2013.01); *G06F 9/4451* (2013.01); *G06F 9/46* (2013.01); *G06F 16/2291* (2019.01);
(Continued)

(58) Field of Classification Search
CPC . G06F 8/61; G06F 9/4451; G06F 9/46; G06F 16/2291; G06F 16/245;
(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

Non-Final Office Action for U.S. Appl. No. 15/445,625 dated Nov. 29, 2018, 19 pages.
(Continued)

*Primary Examiner* — Qing Chen
(74) *Attorney, Agent, or Firm* — Jaffery, Watson, Mendonsa & Hamilton, LLP

(57) ABSTRACT

A software package having one or more custom metadata types is installed. The software package has computer-executable code that causes one or more processors to perform at least accessing the one or more custom metadata types. One or more protected records are accessed within the one or more custom metadata types. For the protected records, code in the installed package can read the protected records and can return the records whether protected or not. If the custom metadata types are in a separate base package, code in the base package can also read the records. Returned information is stored in the one or more custom metadata records that has been accessed.

18 Claims, 16 Drawing Sheets

(51) Int. Cl.
  *G06F 16/245*   (2019.01)
  *G06F 16/22*    (2019.01)
  *G06F 9/445*    (2018.01)
  *G06F 9/46*     (2006.01)

(52) U.S. Cl.
  CPC ........ *G06F 16/245* (2019.01); *G06F 21/6227* (2013.01)

(58) Field of Classification Search
  CPC ......... G06F 17/30342; G06F 17/30424; G06F 21/62; G06F 21/6218; G06F 21/6227
  USPC .......................... 717/174–178; 707/783–788
  See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0223022 A1 | 10/2005 | Weissman et al. |
| 2007/0179956 A1 | 8/2007 | Whitmyer |
| 2009/0171991 A1 | 7/2009 | Gitai et al. |
| 2009/0177744 A1 | 7/2009 | Marlow et al. |
| 2011/0296380 A1 | 12/2011 | Dvinov et al. |
| 2013/0036110 A1 | 2/2013 | Scott et al. |
| 2013/0117291 A1 | 5/2013 | Roy-Faderman |
| 2013/0304713 A1 | 11/2013 | Roy-Faderman |
| 2013/0347127 A1 | 12/2013 | Vedabrata et al. |
| 2014/0006441 A1 | 1/2014 | Torman et al. |
| 2014/0195644 A1 | 7/2014 | Marin et al. |
| 2014/0229511 A1 | 8/2014 | Tung et al. |
| 2015/0317350 A1 | 11/2015 | Roy-Faderman |
| 2016/0048844 A1 | 2/2016 | Vogt, Jr. et al. |

OTHER PUBLICATIONS

Non-Final Office Action for U.S. Appl. No. 15/164,781 dated Jan. 16, 2018, 15 pages.

(56) References Cited

OTHER PUBLICATIONS

Notice of Allowance for U.S. Appl. No. 15/164,781 dated Jul. 3, 2018, 14 pages.
Final Office Action for U.S. Appl. No. 15/445,625 dated Jun. 7, 2019, 11 pages.
Non-Final Office Action for U.S. Appl. No. 15/445,625 dated Sep. 4, 2019, 14 pages.

|  | Locked | Upgradable | Subscriber editable |
|---|---|---|---|
| Package developer can change field value via package upgrade | 🚫 | ✏️ | 🚫 |
| Package code can change field value | 🚫 | 🚫 | ✏️ |
| Subscriber can change field value | 🚫 | 🚫 | ✏️ |
| An extension package can change field value | 🚫 | 🚫 | 🚫 |
| Extension package's code can change field value | 🚫 | 🚫 | ✏️ |

FIG. 1

| DevName | Label | A__c<br>Subscriber editable | B__c<br>Upgradable | C__c<br>Upgradable | D__c<br>Subscriber editable | |
|---|---|---|---|---|---|---|
| ⊘ | ⊘ | Sub | Base | Base | Sub | ⎫ Base package public records 310 |
| ⊘ | ⊘ | Sub | Base | Base | Sub | ⎭ |
| ⊘ | ⊘ | ⊘ | Base | Base | ⊘ | ⎫ Base package protected records 320 |
| ⊘ | ⊘ | ⊘ | Base | Base | ⊘ | ⎭ |
| ⊘ | ⊘ | Sub | Ext | Ext | Sub | ⎫ Extension package public records 330 |
| ⊘ | ⊘ | Sub | Ext | Ext | Sub | ⎭ |
| Sub | Sub | Sub | Sub | Sub | Sub | ⎫ Unmanaged records (unmanaged package, subscriber created, or cloned records) 340 |
| Sub | Sub | Sub | Sub | Sub | Sub | ⎭ |

FIG. 3

Record protection and field managability for a managed package in a subscriber org

| Namespace of record | Record protection | Field managability | Operation from managed package | | | | |
|---|---|---|---|---|---|---|---|
| | | | Create | Read | Update | Upgrade | Delete |
| Managed package record | Public | Upgradable | Works | Works | Fails | Works | Fails |
| | | Sub editable | Works | Works | Works | Fails | Fails |
| | Protected | Upgradable | Works | Works | Fails | Works | Works |
| | | Sub editable | Works | Works | Works | Fails | Works |
| Subscriber org record | Public | Upgradable | Works | Works | Works | n/a | Works |
| | | Sub editable | Works | Works | Works | n/a | Works |
| | Protected | Upgradable | Works | Works | Fails | n/a | Fails |
| | | Sub editable | Works | Works | Fails | n/a | Fails |

FIG. 9A

| Base: CMD Type | Label | Field 1 | Field 2 | Field 3 | Field 4 |
|---|---|---|---|---|---|
| Base: Record 1 | | | | | |
| Base: Record 1 | | | | | |
| Ext: Record 1 | | | | | |
| Ext: Record 4 | | | | | |
| Ext: Record 5 | | | | | |
| Sub: Record 6 | | | | | |
| Sub: Record 7 | | | | | |

- Custom Metadata Type created in Base Package 1000
- Records created in Base Package 1010
- Records created in Extension Package 1020
- Records created in Subscriber org 1030

ARCHITECTURES AND TECHNIQUES FOR RECORD PROTECTION AND FIELD MANAGEMENT

CLAIM OF PRIORITY

This United States continuation patent application is related to, and claims priority to, U.S. patent application Ser. No. 15/164,781, entitled "ARCHITECTURES AND TECHNIQUES FOR RECORD PROTECTION AND FIELD MANAGEMENT", filed May 25, 2016, now U.S. Pat. No. 10,114,628, with an issue date of Oct. 30, 2018, the entire content of which is incorporated herein by reference.

TECHNICAL FIELD

Embodiments relate to techniques for providing granular control over custom records in a database environment. More particularly, embodiments relate to techniques for providing record protection in combination with field editability to provide very granular control over editability of custom metadata records.

BACKGROUND

In some database environments users are given the ability to create custom records and/or other custom features. In some situations, in order to provide sufficient functionality and/or security, users that have created these custom features and/or platform providers should have sufficient management control.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1 is a table describing one embodiment of the functionality of custom fields in subscriber entities for managed packages.

FIG. 3 is a table describing one embodiment of managed editability of custom metadata types in subscriber organizations for managed metadata types having base package public records, base package protected records, extension package public records and unmanaged records.

FIG. 9A is a table corresponding to one embodiment of a technique for providing record protection and field manageability and how it affects operations originating from a managed package in a subscriber organization.

FIG. 10 is a table corresponding to one embodiment of readability for protected records in custom metadata types.

DETAILED DESCRIPTION

Figure 2:
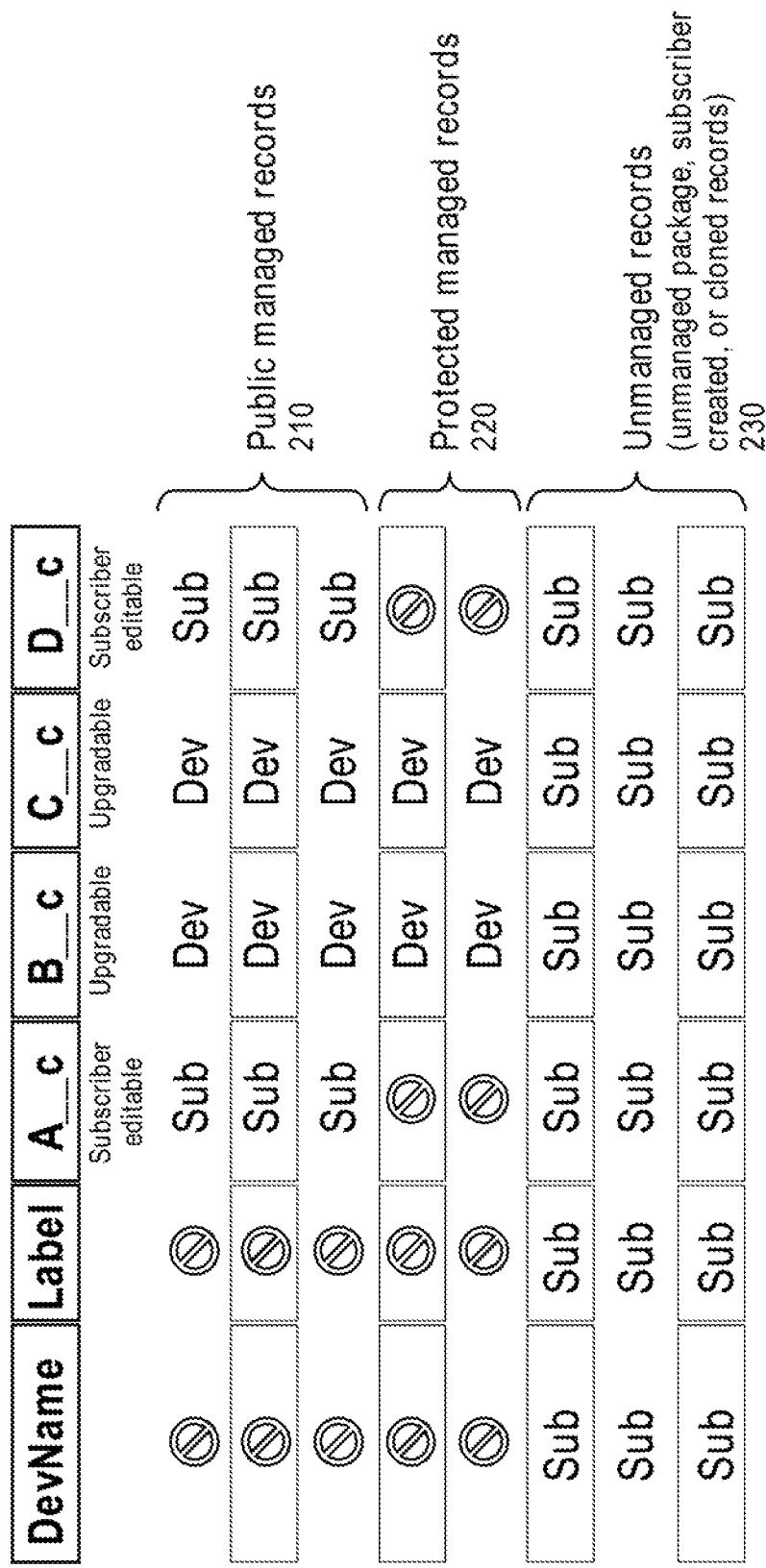
FIG. 2 is a table describing one embodiment of managed editability of custom metadata types in subscriber organizations for managed metadata types having public managed records, protected managed records and unmanaged records.

In the following description, numerous specific details are set forth. However, embodiments of the invention may be practiced without these specific details. In other instances, structures and techniques have not been shown in detail in order not to obscure the understanding of this description.

Custom metadata types are metadata about metadata, sometimes referred to as metametadata. Thus, unlike custom objects or custom settings records, the records of custom metadata types can be deployed from a sandbox with change sets or packages in managed packages. The "custom" in custom metadata types refers to metametadata that can be created by users/entities other than the platform provider. In various embodiments, custom metadata types can be used to automate the software development lifecycle and application management lifecycle of application configurations. Because the records are metadata rather than data, they can leverage metadata tools for managing, packaging and deploying metadata.

In various embodiments, the techniques and structures described herein can allow, in a database environment, creators of records of custom metadata types (whether they are the creators of the types or not) to mark/designate some or all of those records as protected. As one example, in one embodiment, if a creator of records of custom metadata types releases those records in a managed package and a different organization/tenant/group installs the package, the following is true: 1) code in the managed package can read the records through whatever means is available (e.g., if code accesses these records via a query, the query will return records that match it whether or not they are protected); 2) if the custom metadata type is in a separate (e.g., base) package, code in that package can also read the records (e.g., so that the base code that uses the type to implement a feature works with the new records; and 3) with a few exceptions (described below), other means for retrieving records from the type will not be able to see these records (e.g., if code written accesses records via a query, the protected installed records are filtered out).

Some of the exceptions to 3) above are related to diagnostic tools that can be made available to creators of a base platform to be utilized (e.g., database environment provider), the type (e.g., the record package or the base package) and/or the records. In some embodiments, tools for some or all support staff in some organizations may be able to see protected records in the installing organization with these tools. In some embodiments, some details of the records (e.g., certain field values) may be hidden to some or all of these people even if some part of the records can be seen.

The techniques described herein allow creators of records to include information of some level of sensitivity in their custom metadata records. For example, custom metadata types can be utilized to drive monetization of external application program interfaces (APIs). Records of this type might include API keys or secrets, which would be visible to code in the base platform so long as the package containing the records was licensed to subscribers, but subscribers would not be able to copy the API keys/secrets. If the license to the package were to lapse, the former subscribers would not be able to use the API keys/secrets.

Many of the specific examples provided herein relate to on-demand services environments; however, the concepts may be more broadly applicable. One example of an on-demand service environment is a multitenant database environment. Various embodiments of a multitenant database environment are described below. Within the multitenant environment, a tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

The following description provides a few use case examples for application of the structures and mechanisms described herein. These examples are not intended to be exhaustive. In one example, records can be made immutable via use of record protection in combination with field editability to provide very granular control over editability of custom metadata records. Field editability can be used to provide control of columns in a table and record protection can be used to provide control of rows in the table. The result is cell-by-cell (or nearly cell-by-cell) control over editability of a database table. Thus, records can be made immutable to a customer/subscriber of a code package having/accessing the table.

These techniques can be utilized to, for example, preserve default values. The default values can be edited by cloning the record and editing the clone, but the original defaults are preserved in the protected record and can be used for roll back, if necessary. In one embodiment, the code package can see the records even if the customer/subscriber cannot see the record directly. This can be useful to prevent subscribers/customers from changing functionality that depends on these records while allowing the customer/subscriber to customize the functionality that other records define/control.

As another use example, records can be used to define the behavior of an application, which can be proprietary. Hiding the records helps protect the proprietary elements. Also, records can contain tokens or keys to systems that the package developer may want to be accessible without allowing direct customer access. In one embodiment, hiding records can be done by protecting the entire corresponding metadata type (e.g., the entire table).

In one embodiment, only a portion of records are hidden. For example, an API management tool may provide integrations into TWITTER, FACEBOOK or GOOGLE and the developer may charge the customer for these interfaces. This can be accomplished by providing hidden API credentials in the package. The developer may also allow the customer to use their own API token for these services, or add connections to services not provided by the developer. In this situation, the customer should be able to create or edit other records in the same table. This would not be possible if the entire table is hidden. In one embodiment, this can be accomplished by making the table (metadata type) public and hiding specific records. Trademarks used herein (e.g., TWITTER, FACEBOOK, GOOGLE) are the property of the respective owners.

FIG. 1 is a table describing one embodiment of the functionality of custom fields in subscriber entities for managed packages. The example of FIG. 1 is one of custom field editability in subscriber entities for managed packages. The table applies to records continued in the managed package.

In one embodiment, managed packages can be distributed between tenants of a multitenant environment. For example, a developer tenant can develop one or more software packages that can be distributed to (via subscription or other structures) other tenants of the multitenant environment. Various embodiments of multitenant environments are described in greater detail below.

In one embodiment, there are three levels of editability for custom fields in managed packages. Records of the packages metadata type created by the subscriber entity are controlled by the subscriber. In one embodiment, an extension package can change the subscriber-controlled value, but the parent value will not be updated, which will be either the default value provided by the base package or a subscriber customization in the base package.

In the example of FIG. 1, when a custom field is locked in a managed package a package developer is not allowed to change the field value via package upgrade, package code cannot change the field value, a subscriber cannot change the field value, an extension package cannot change the field value, and the extension packages code cannot change the field value.

In the example of FIG. 1, when a custom field is upgradable in a managed package a package developer is allowed to change the field value via package upgrade. The remaining attributes are the same for the locked custom field and the upgradeable custom field. That is, for an upgradable custom field in a managed package, package code cannot change the field value, a subscriber cannot change the field value, an extension package cannot change the field value, and the extension packages code cannot change the field value.

In the example of FIG. 1, when a custom field is subscriber editable, the package developer cannot change the field value via package upgrade and an extension package cannot change the field value. When the custom field is subscriber editable, package code can change the field value (e.g., via callout, if necessary), the subscriber can change the field value and extension package code can change the field value (e.g., via callout, if necessary).

The techniques described herein provide protections for records within a type. In contrast, within the JAVA programming language protection is provided by class. Thus, the use of custom metadata to protect records as described herein provides a more flexible and more granular protection mechanism than would otherwise be available.

Various embodiments of the techniques and mechanisms described herein allows for creation of declarative frameworks that can be used, for example, for internal teams, partners and/or customers. Rather than building apps from data, the developer(s) can build apps that are defined and driven by their own types of metadata, which is the information that describes the configuration of each organization/customer.

In various embodiments, custom metadata is customizable deployable, packagable and upgradable application metadata. Custom metadata types can be created to define the form of the application metadata. Reusable functionality can then be built to determine behavior based on metadata of that type. In one embodiment, a custom metadata type has a list of custom fields that represent aspects of the metadata. After creation of a public custom metadata type, custom metadata records can be created declaratively that are defined by that type. In one embodiment, when a public custom metadata type is packaged, customers or organizations that install the package can add their own records to the metadata type. The reusable functionality reads custom metadata and uses it to produce customized application behavior.

FIG. 2 is a table describing one embodiment of managed editability of custom metadata types in subscriber organizations for managed metadata types having public managed records, protected managed records and unmanaged records.

In one embodiment, a subscriber to a managed package containing a custom metadata type is not allowed to change the values in the fields on records that are contained in the package; only the organization/developer of the type change the values in the custom fields on records included in the package. In one embodiment, custom metadata fields are manageable, which means that the developer of a type can decide who can change field values after they are deployed to a subscriber or customer.

In one embodiment, the following three levels (or settings) can be supported. In alternate embodiments, additional and/or different levels can be supported. Locked (or Locked After Release): for any record of the type, the value of the field is immutable after upload (or after the package is released). In one embodiment, this applies to the developer where the record was created. Subscriber Editable: Anyone with the correct permissions can change the value of the field at will. Any changes the developer deploys do not overwrite values in the subscriber/customer organization. Upgradable: The developer of a record can change the value of the field by releasing a new version of the custom metadata package. In one embodiment, the subscriber is not allowed to change the value of the field.

In one embodiment, custom metadata types and records have names and labels. Type names are unique within their namespace and record names are unique within their custom metadata type and namespace. As described in greater detail below, namespaces can be utilized to provide the custom metadata types and fields as described herein.

As mentioned above, custom metadata records can be protected after release. In various embodiments, one or more of the following access management is provided. Code that is in the same managed package as the custom metadata records can read the records. Code that is in the same managed package as custom metadata types can read the records that belong to the type. Code that is in a managed package that does not contain either the type or the protected record cannot read the protected records. Code that the subscriber/customer creates and code that is in an unmanaged package cannot read the protected records. The developer can modify protected records only with a package upgrade. The subscriber/customer cannot read or modify protected records. The developer name of a protected record cannot be changed after release.

In one embodiment, custom metadata types can also be protected. In one embodiment, the custom metadata types provide the same access protections as the protected records described above. In one embodiment, if a type is changed from protected to public, the protected records remain protected and other records become public.

In the example of FIG. 2, the illustrated metadata type includes public managed records 210, protected managed records 220 and unmanaged records 230. In this example, control is provided on a column-by-column basis. In one embodiment, if the code can access the records, it can see the contents of the records. If the code is part of the managed package, it can edit "subscriber editable" fields but cannot edit "upgradable fields." It can, however, read all of them. If the code is not part of the managed package, it cannot access the protected records at all. In one embodiment, in order to use new values, a subscriber would clone and edit the cloned value(s).

In one embodiment, queries are filtered based on namespace and/or other protection indicators (e.g., bits, flags). For example, in one embodiment, protected records have a protection indicator set and have the same namespace as managed type.

In the example of FIG. 2, the DevName column and the Label column are locked, so the contents are not editable by a subscriber in either public managed records 210 or protected managed records 220. The "A_c" column and the "D_c" column are subscriber editable columns that are editable by the subscriber for public managed records 210, but not protected managed records 220. The "B_c" column and the "C_c" column are upgradable columns that are editable by a developer in public managed records 210 and protected managed records 220. In the example of FIG. 2, all of unmanaged records (e.g., unmanaged package, subscriber created records, cloned records) 230 are subscriber editable.

FIG. 3 is a table describing one embodiment of managed editability of custom metadata types in subscriber organizations for managed metadata types having base package public records 310, base package protected records 320, extension package public records 330 and unmanaged records 340.

In the example of FIG. 3, the DevName column and the Label column are locked, so the contents are not editable by a subscriber in any of base package public records 310, base package protected records 320 or extension package public records 330. The "A_c" column and the "D_c" column are subscriber editable columns that are editable by the subscriber for base package public records 310 and extension package public records 330 but not base package protected records 320. The "B_c" column and the "C_c" column are upgradable columns that are editable in the base package (e.g., base package public records 310 and base package protected records 320) and in an extension package by the subscriber to the extension package (e.g., extension package public records 330). In the example of FIG. 3, all of unmanaged records (e.g., unmanaged package, subscriber created records, cloned records) 340 are subscriber editable.

Figure 4:
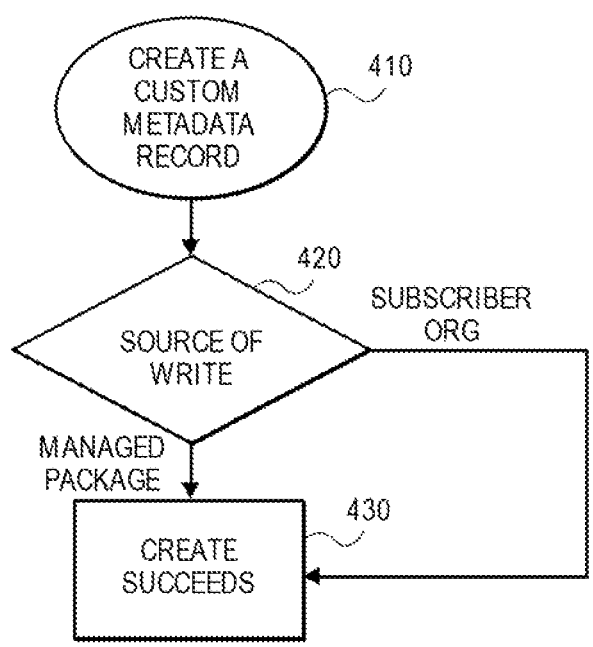
FIG. 4 is a flow diagram of one embodiment of a technique for creating public custom metadata records in an installed managed package.

FIG. 4 is a flow diagram of one embodiment of a technique for creating public custom metadata records in an installed managed package. In the example of FIG. 4, records created in the subscriber organization are in the subscriber namespace even if it is created by code in the managed package.

A custom metadata record is created, 410. In one embodiment, the record is a public record created in an installed managed package. The source of the write/create is determined, 420. If the source of the write, 420, is the managed package, the create operation succeeds, 430. If the source of the write, 420, is the subscriber organization, the create operation succeeds, 430.

Figure 5:
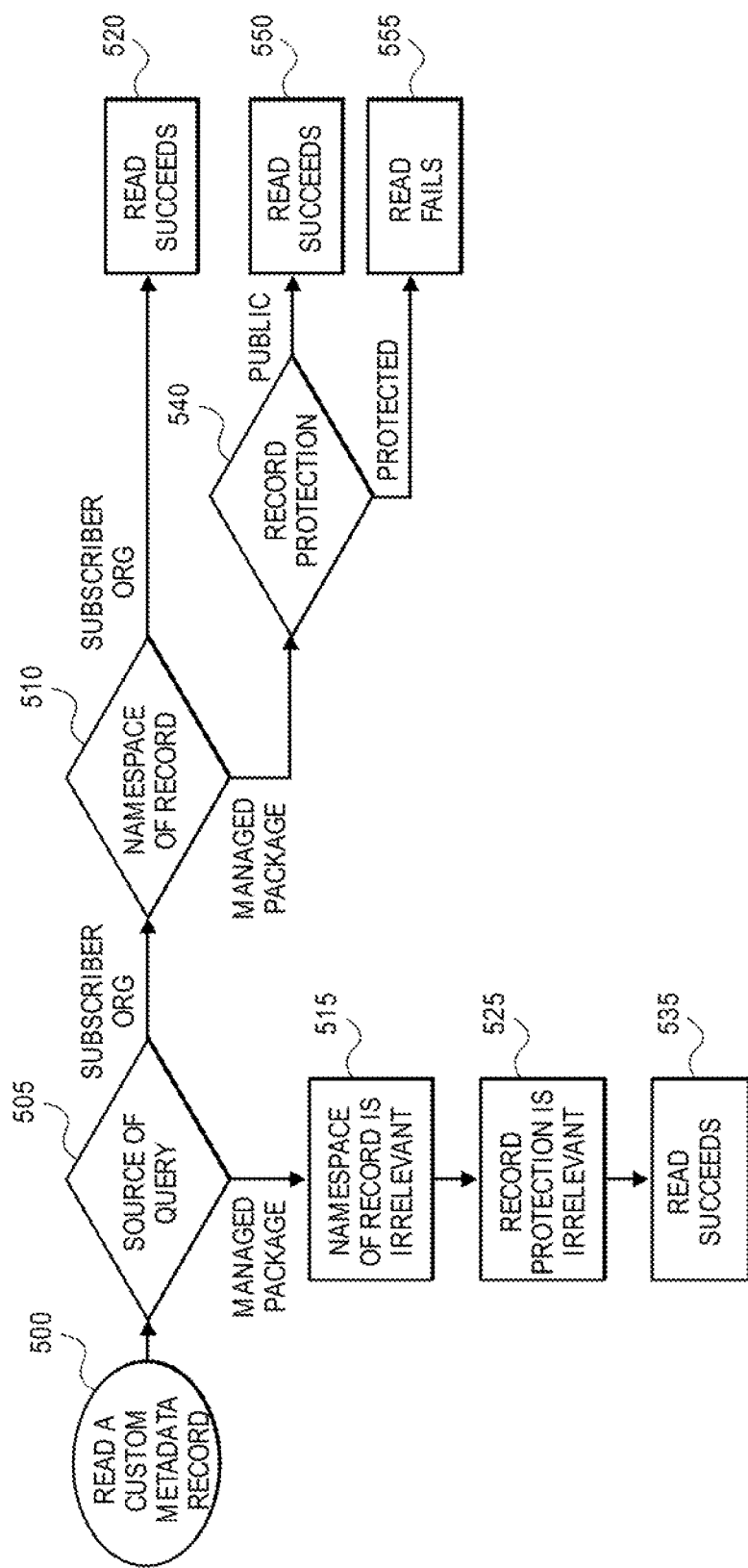
FIG. 5 is a flow diagram of one embodiment of a technique for reading public custom metadata records in an installed managed package.

FIG. 5 is a flow diagram of one embodiment of a technique for reading custom metadata records in an installed managed package. A custom metadata record is read, 500. The source of the query to read the custom metadata record is determined, 505. If the query is from the same managed package as the package containing the custom metadata type, 505, the namespace of the record is irrelevant, 515, and the record protection settings are irrelevant, 525, and the read is allowed, 535.

If the query is from a subscriber organization, 505, the namespace of the record is determined, 510. If the namespace of the record corresponds to the subscriber organization, 510, then the read is allowed, 520. If the namespace of the record corresponds to the managed package, 510, then record protection settings are evaluated, 540. If the record protection settings are public, 540, then the record read is allowed, 550. If the record protection settings are protected, 540, then the record read is not allowed, 555.

Figure 6:
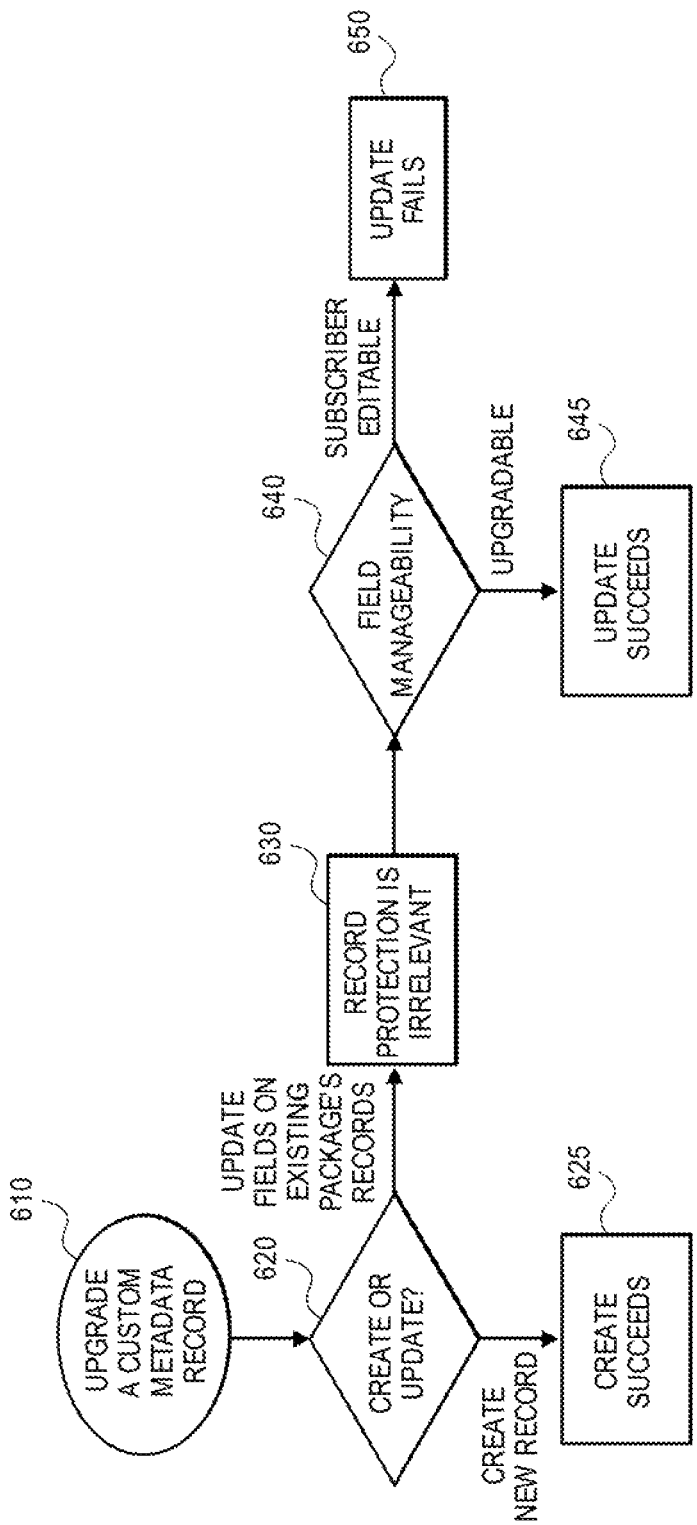
FIG. 6 is a flow diagram of one embodiment of a technique for upgrading public custom metadata records in an installed managed package.

FIG. 6 is a flow diagram of one embodiment of a technique for upgrading public custom metadata records in an installed managed package. The example of FIG. 6 ignores the case of a managed package attempting to update records created in a subscriber organization namespace. This is assumed to be an edge case.

An upgrade to a custom metadata record is initiated, 610. The upgrade is evaluated to determine if it is a creation or an update, 620. If the upgrade is a creation, 620, the new record is created, 625. If the upgrade is an update to fields on an existing package's records, 620, the record protection level is irrelevant, 630. If the field manageability setting is upgradable, 640, the update is allowed, 645. If the field manageability setting is subscriber editable, 640, the update is not allowed, 650.

Figure 7:
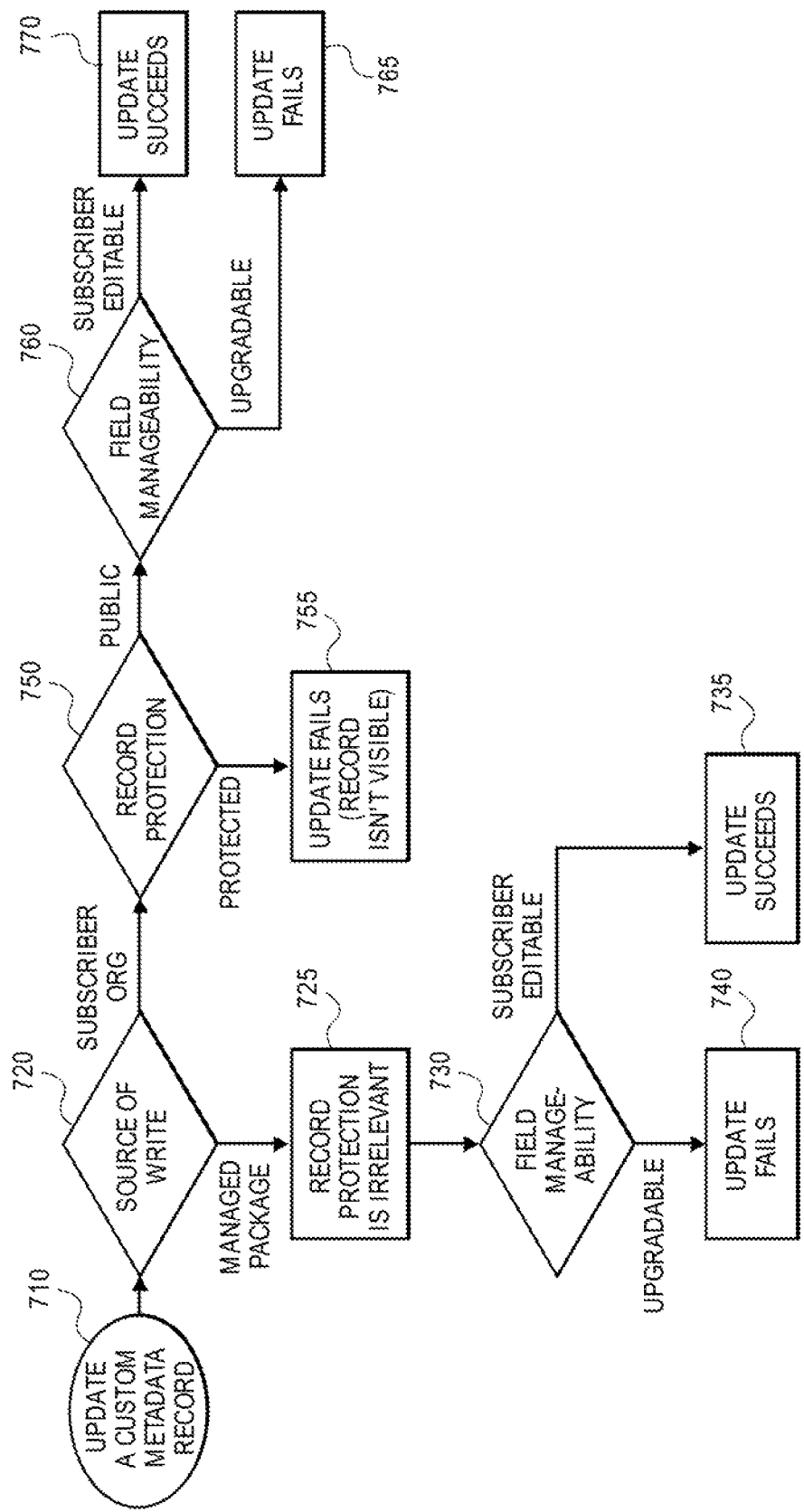
FIG. 7 is a flow diagram of one embodiment of a technique for updating public custom metadata records in an installed managed package.

FIG. 7 is a flow diagram of one embodiment of a technique for updating public custom metadata records in an installed managed package. An update to a custom metadata record is initiated, 710. This update is outside of the process of upgrading a package, which is discussed with respect to FIG. 6. The source of the write operation is determined, 720. If the write is from a managed package, 720, then the record protection setting is irrelevant, 725 and the field manageability settings are determined, 730. If the field manageability setting is upgradable, 730, then the update is not allowed, 740. If the field manageability setting is subscriber editable, 730, then the update is allowed, 735.

If the source of the write is the subscriber organization, 720, then the record protection settings are determined, 750. If the record protection setting is protected, 750, then the update is not allowed, 755. In one embodiment, this is because the record is not visible. If the record protection setting is public, 750, then the field manageability settings are determined, 760.

If the field manageability setting is upgradable, 760, then the update is not allowed, 765. If the field manageability setting is subscriber editable, 760, then the update is allowed, 770.

Figure 8:
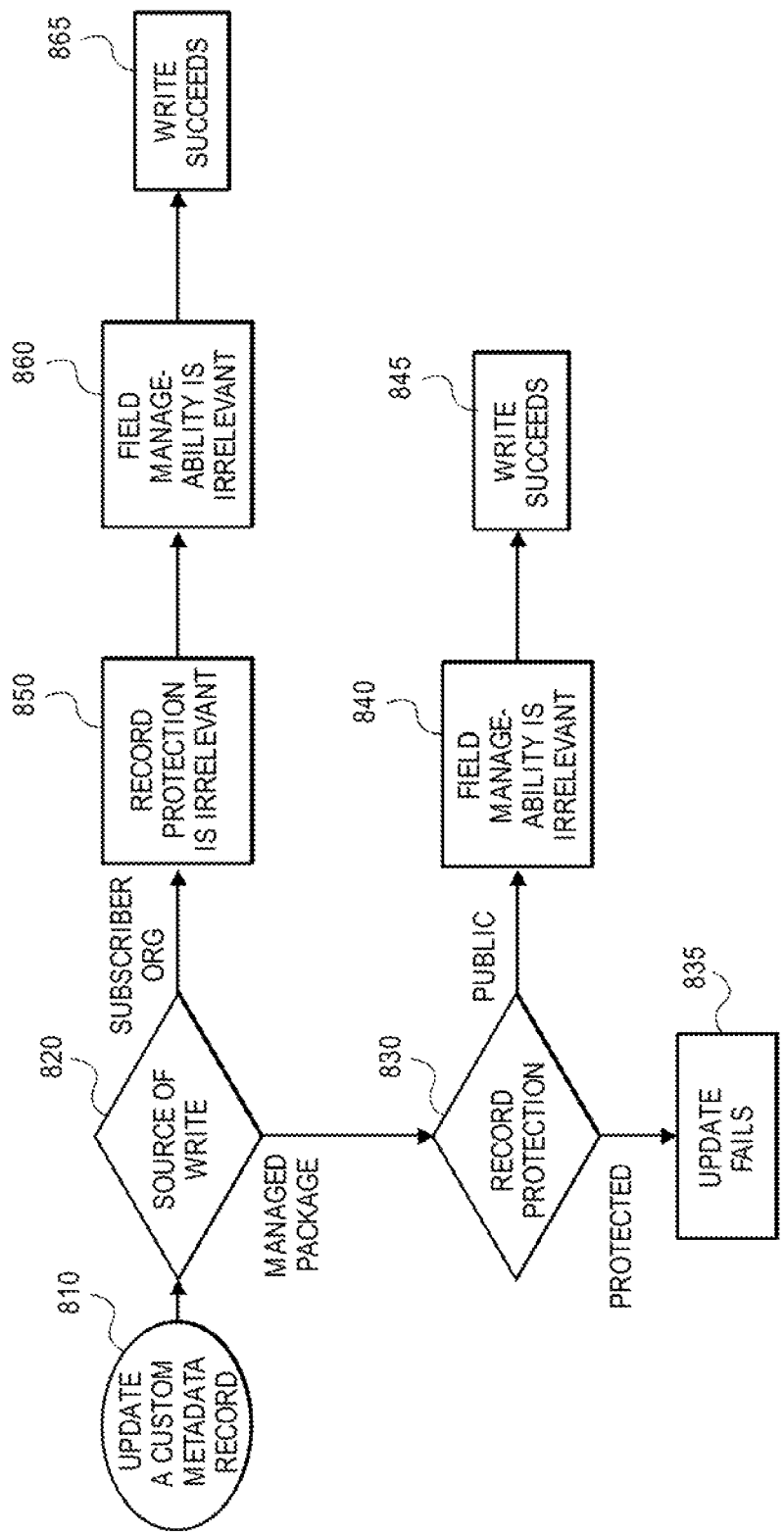
FIG. 8 is a flow diagram of one embodiment of a technique for updating public custom metadata records in an installed managed package in which records have been created by the subscriber organization

FIG. 8 is a flow diagram of one embodiment of a technique for updating public custom metadata records in an installed managed package in which records have been created by the subscriber organization. In this example, the subscriber organization has created their own records in the metadata type provided in the managed package. An update to a custom metadata record in a subscriber package is initiated, 810. The source of the write is determined, 820. If the source of the write is the managed package, 820, then the record protection settings are determined, 830. If the record protection setting is protected, 830, then the update is not allowed, 835. If the record protection setting is public, 830, then the field manageability setting is irrelevant, 840, and the write is allowed, 845.

If the source of the write is the subscriber organization, 820, then the record protection settings are irrelevant, 850 and the field manageability setting is irrelevant, 860, and the write is allowed, 865.

FIGS. 9A-E provide tables corresponding to one embodiment of a technique for providing record protection and field manageability. The example of FIGS. 9A-E, corresponds to an environment in which the code is implemented using the APEX programming language, where APEX has tooling support; however, the concepts described herein can be implemented using other languages and structures.

Figure 9B:
FIG. 9B is a table corresponding to one embodiment of a technique for providing record protection and field manageability and how it affects operations originating from a sub scriber organization.
Figure 9C:
FIG. 9C is a table corresponding to one embodiment of a technique for providing record protection and field manageability for managed base and extension packages and how it affects operations originating from a managed package.
Figure 9D:
FIG. 9D is a table corresponding to one embodiment of a technique for providing record protection and field manageability for managed base and extension packages and how it affects operations originating from an extension package.
Figure 9E:
FIG. 9E is a table corresponding to one embodiment of a technique for providing record protection and field manageability for managed base and extension packages and how it affects operations originating from a subscriber organization.

In one embodiment, the custom metadata type (table) is in the released base package (the "managed package" in table 900 of FIGS. 9A and 9B). The metadata types are public, and the base and extension packages are released managed packages. In the example of FIGS. 9A-E, the term "upgrade" refers to a package upgrade and the term "update" comes from changes made outside of the upgrade process (e.g., in response to an input, a click, code execution).

In the example of FIGS. 9A-E, the term "create" refers to records created in any situation (e.g., in response to clicks, execution of code, updates). In one embodiment, managed packages can create records in their own namespace via installs or upgrades. In one embodiment, code in the managed package that creates records outside of the installation or upgrade creates records in the subscriber namespace. In the example of FIGS. 9A-E, the term "delete" refers to record deletion.

Table 900 (in FIGS. 9A and 9B) provides a listing of operation and functionality for record protection and field manageability for a managed package in a subscriber organization. Table 950 (in FIGS. 9C, 9D and 9E) provides a listing of operation and functionality for record protection and field manageability for managed base packages and extension packages in subscriber organization.

FIG. 10 is a table corresponding to one embodiment of readability for protected records in custom metadata types. In one embodiment, the base package can read any records that are added to a custom metadata type (metadata table) in the base package, regardless of where the records are created (base, extension or subscriber organization) and regardless of whether they are protected or public. The table of FIG. 10 illustrates relationships between records created by different packages/organizations.

In the example of FIG. 10, custom metadata type 1000 is created in the base package. In the example of FIG. 10, custom metadata type 1000 includes a label and fields 1, 2, 3 and 4; however, other configurations can also be supported. Within the base package, one or more records 1010 (which are records of the custom metadata type) can be created. One or more records 1020 of the custom metadata type can be created in an extension package. Similarly, one or more records 1030 of the custom metadata type can be create in a subscriber organization.

Figure 11:
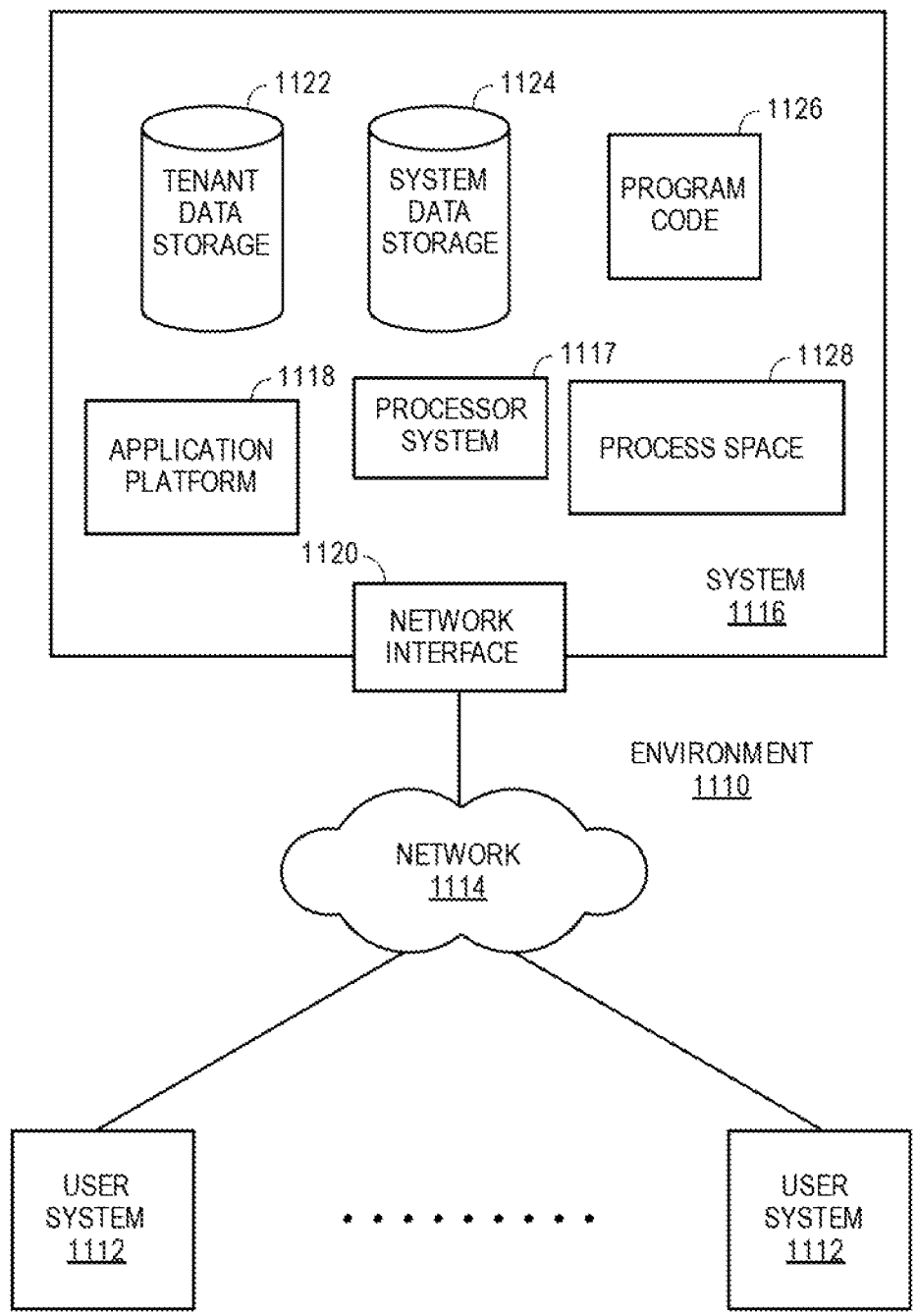
FIG. 11 is a block diagram of one environment wherein an on-demand database service might be used.

FIG. 11 illustrates a block diagram of an environment 1110 wherein an on-demand database service might be used. Environment 1110 may include user systems 1112, network 1114, system 1116, processor system 1117, application platform 1118, network interface 1120, tenant data storage 1122, system data storage 1124, program code 1126, and process space 1128. In other embodiments, environment 1110 may not have all of the components listed and/or may have other elements instead of, or in addition to, those listed above.

Environment 1110 is an environment in which an on-demand database service exists. User system 1112 may be any machine or system that is used by a user to access a database user system. For example, any of user systems 1112 can be a handheld computing device, a mobile phone, a laptop computer, a work station, and/or a network of computing devices. As illustrated in herein FIG. 11 (and in more detail in FIG. 11) user systems 1112 might interact via a network 1114 with an on-demand database service, which is system 1116.

An on-demand database service, such as system 1116, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1116" and "system 1116" will be used interchangeably herein. A database image may include one or more database objects. A relational database management system (RDMS) or the equivalent may execute storage and retrieval of information against the database object(s). Application platform 1118 may be a framework that allows the applications of system 1116 to run, such as the hardware and/or software, e.g., the operating system. In an embodiment, on-demand database service 1116 may include an application platform 1118 that enables creation, managing and executing one or more applications developed by the provider of the on-demand database service, users accessing the on-demand database service via user systems 1112, or third party application developers accessing the on-demand database service via user systems 1112.

The users of user systems 1112 may differ in their respective capacities, and the capacity of a particular user system 1112 might be entirely determined by permissions (permission levels) for the current user. For example, where a salesperson is using a particular user system 1112 to interact with system 1116, that user system has the capacities allotted to that salesperson. However, while an administrator is using that user system to interact with system 1116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1114 is any network or combination of networks of devices that communicate with one another. For example, network 1114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 1112 might communicate with system 1116 using TCP/IP and, at a higher network level, use other common Internet protocols to communicate, such as HTTP, FTP, AFS, WAP, etc. In an example where HTTP is used, user system 1112 might include an HTTP client commonly referred to as a "browser" for sending and receiving HTTP messages to and from an HTTP server at system 1116. Such an HTTP server might be implemented as the sole network interface between system 1116 and network 1114, but other techniques might be used as well or instead. In some implementations, the interface between system 1116 and network 1114 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1116, shown in FIG. 11, implements a web-based customer relationship management (CRM) system. For example, in one embodiment, system 1116 includes application servers configured to implement and execute CRM software applications as well as provide related data, code, forms, webpages and other information to and from user systems 1112 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1116 implements applications other than, or in addition to, a CRM application. For example, system 1116 may provide tenant access to multiple hosted (standard and custom) applications, including a CRM application. User (or third party developer) applications, which may or may not include CRM, may be supported by the application platform 1118, which manages creation, storage of the applications into one or more database objects and executing of the applications in a virtual machine in the process space of the system 1116.

One arrangement for elements of system 1116 is shown in FIG. 11, including a network interface 1120, application platform 1118, tenant data storage 1122 for tenant data 1123, system data storage 1124 for system data 1125 accessible to system 1116 and possibly multiple tenants, program code 1126 for implementing various functions of system 1116, and a process space 1128 for executing MTS system processes and tenant-specific processes, such as running applications as part of an application hosting service. Additional processes that may execute on system 1116 include database indexing processes.

Several elements in the system shown in FIG. 11 include conventional, well-known elements that are explained only briefly here. For example, each user system 1112 could include a desktop personal computer, workstation, laptop, PDA, cell phone, or any wireless access protocol (WAP) enabled device or any other computing device capable of interfacing directly or indirectly to the Internet or other network connection. User system 1112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 1112 to access, process and view information, pages and applications available to it from system 1116 over network 1114. Each user system 1112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1116 or other systems or servers. For example, the user interface device can be used to access data and applications hosted by system 1116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1112 and all of its components are operator configurable using applications, such as a browser, including computer code run using a central processing unit such as an Intel Pentium® processor or the like. Similarly, system 1116 (and additional instances of an MTS, where more than one is present) and all of their components might be operator configurable using application(s) including computer code to run using a central processing unit such as processor system 1117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 1116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 1116 is configured to provide webpages, forms, applications, data and media content to user (client) systems 1112 to support the access by user systems 1112 as tenants of system 1116. As such, system 1116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 12:
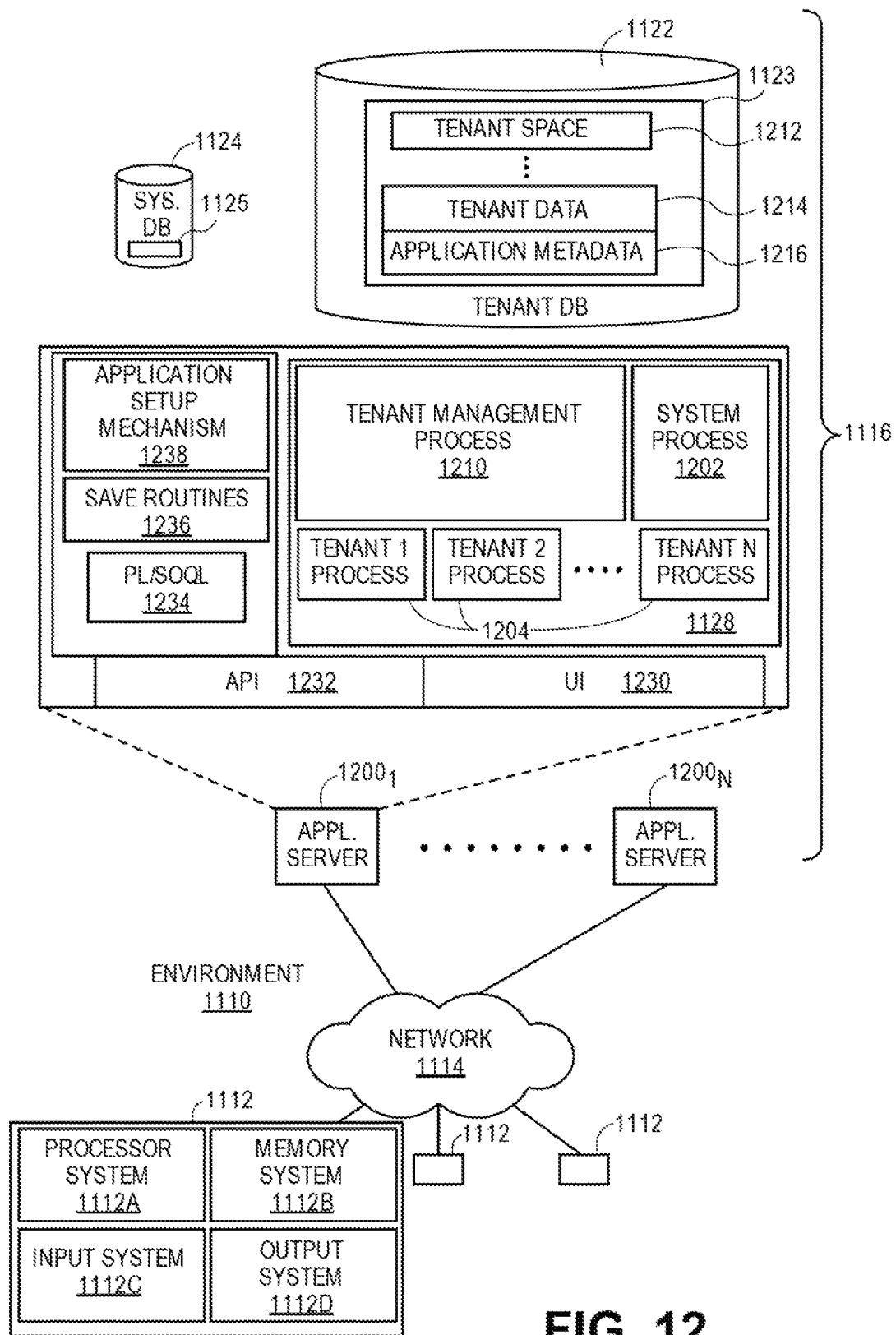
FIG. 12 is a block diagram of one embodiment of elements of environment of FIG. 11 and various possible interconnections between these elements.

FIG. 11 also illustrates environment 1110. However, in FIG. 12 elements of system 1116 and various interconnections in an embodiment are further illustrated. FIG. 12 shows that user system 1112 may include processor system 1112A, memory system 1112B, input system 1112C, and output system 1112D. FIG. 12 shows network 1114 and system 1116. FIG. 12 also shows that system 1116 may include tenant data storage 1122, tenant data 1123, system data storage 1124, system data 1125, User Interface (UI) 1230, Application Program Interface (API) 1232, PL/SOQL 1234, save routines 1236, application setup mechanism 1238, applications servers 1200$_1$-1200$_N$, system process space 1202, tenant process spaces 1204, tenant management process space 1210, tenant storage area 1212, user storage 1214, and application metadata 1216. In other embodiments, environment 1110 may not have the same elements as those listed above and/or may have other elements instead of, or in addition to, those listed above.

User system 1112, network 1114, system 1116, tenant data storage 1122, and system data storage 1124 were discussed above in FIG. 11. Regarding user system 1112, processor system 1112A may be any combination of one or more processors. Memory system 1112B may be any combination of one or more memory devices, short term, and/or long term memory. Input system 1112C may be any combination of input devices, such as one or more keyboards, mice, trackballs, scanners, cameras, and/or interfaces to networks. Output system 1112D may be any combination of output devices, such as one or more monitors, printers, and/or interfaces to networks. As shown by FIG. 12, system 1116 may include a network interface 1120 (of FIG. 11) implemented as a set of HTTP application servers 1200, an application platform 1118, tenant data storage 1122, and system data storage 1124. Also shown is system process space 1202, including individual tenant process spaces 1204 and a tenant management process space 1210. Each application server 1200 may be configured to tenant data storage 1122 and the tenant data 1123 therein, and system data storage 1124 and the system data 1125 therein to serve requests of user systems 1112. The tenant data 1123 might be divided into individual tenant storage areas 1212, which can be either a physical arrangement and/or a logical arrangement of data. Within each tenant storage area 1212, user storage 1214 and application metadata 1216 might be similarly allocated for each user. For example, a copy of a user's most recently used (MRU) items might be stored to user storage 1214. Similarly, a copy of MRU items for an entire organization that is a tenant might be stored to tenant storage area 1212. A UI 1230 provides a user interface and an API 1232 provides an application programmer interface to system 1116 resident processes to users and/or developers at user systems 1112. The tenant data and the system data may be stored in various databases, such as one or more Oracle™ databases.

Application platform 1118 includes an application setup mechanism 1238 that supports application developers' creation and management of applications, which may be saved as metadata into tenant data storage 1122 by save routines 1236 for execution by subscribers as one or more tenant process spaces 1204 managed by tenant management process 1210 for example. Invocations to such applications may be coded using PL/SOQL 1234 that provides a programming language style interface extension to API 1232. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 1216 for the subscriber making the invocation and executing the metadata as an application in a virtual machine.

Each application server 1200 may be communicably coupled to database systems, e.g., having access to system data 1125 and tenant data 1123, via a different network connection. For example, one application server $1200_1$ might be coupled via the network 1114 (e.g., the Internet), another application server $1200_{N-1}$ might be coupled via a direct network link, and another application server $1200_N$ might be coupled by yet a different network connection. Transfer Control Protocol and Internet Protocol (TCP/IP) are typical protocols for communicating between application servers 1200 and the database system. However, it will be apparent to one skilled in the art that other transport protocols may be used to optimize the system depending on the network interconnect used.

In certain embodiments, each application server 1200 is configured to handle requests for any user associated with any organization that is a tenant. Because it is desirable to be able to add and remove application servers from the server pool at any time for any reason, there is preferably no server affinity for a user and/or organization to a specific application server 1200. In one embodiment, therefore, an interface system implementing a load balancing function (e.g., an F5 Big-IP load balancer) is communicably coupled between the application servers 1200 and the user systems 1112 to distribute requests to the application servers 1200. In one embodiment, the load balancer uses a least connections algorithm to route user requests to the application servers 1200. Other examples of load balancing algorithms, such as round robin and observed response time, also can be used. For example, in certain embodiments, three consecutive requests from the same user could hit three different application servers 1200, and three requests from different users could hit the same application server 1200. In this manner, system 1116 is multi-tenant, wherein system 1116 handles storage of, and access to, different objects, data and applications across disparate users and organizations.

As an example of storage, one tenant might be a company that employs a sales force where each salesperson uses system 1116 to manage their sales process. Thus, a user might maintain contact data, leads data, customer follow-up data, performance data, goals and progress data, etc., all applicable to that user's personal sales process (e.g., in tenant data storage 1122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1116 might also maintain system level data usable by multiple tenants or other data. Such system level data might include industry reports, news, postings, and the like that are sharable among tenants.

In certain embodiments, user systems 1112 (which may be client systems) communicate with application servers 1200 to request and update system-level and tenant-level data from system 1116 that may require sending one or more queries to tenant data storage 1122 and/or system data storage 1124. System 1116 (e.g., an application server 1200 in system 1116) automatically generates one or more SQL statements (e.g., one or more SQL queries) that are designed to access the desired information. System data storage 1124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc.

Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A non-transitory computer-readable medium having stored thereon instructions that, when executed by one or more processors, are configurable to cause the one or more processors to:
install a base software package having one or more custom metadata types, wherein the base software package includes computer-executable code that, when executed by the one or more processors, causes the one or more processors to perform one or more tasks that comprise at least accessing fields of the one or more custom metadata types;
access one or more protected fields, wherein, for the one or more protected fields, code in the base software package to read the one or more protected fields in the base software package and to return the accessed fields of the one or more custom metadata types whether protected or not, and if an extension software package contains additional fields within the one or more custom metadata types in the base software package, code in the base software package also to read the one or more protected fields in the extension software package and to return the accessed fields of the one or more custom metadata types whether protected or not, and wherein the extension software package is allowed to change values in protected fields within the one or more custom metadata types in the extension software package, but the extension software package is not allowed to change values in fields within the one or more custom metadata types in the base software package; and
return information stored in the one or more protected fields that have been accessed.

2. The non-transitory computer-readable medium of claim 1 wherein the base software package is installed in a subscriber organization that is separate from an originating organization providing the base software package.

3. The non-transitory computer-readable medium of claim 2 wherein the subscriber organization and the originating organization are both tenants within a single multitenant environment.

4. The non-transitory computer-readable medium of claim 1 wherein the information stored in the one or more protected fields comprises an application program interface (API) key.

5. The non-transitory computer-readable medium of claim 4 wherein protection for the API key is based on a subscription status.

6. The non-transitory computer-readable medium of claim 1 wherein field editability is to be used to provide control of columns in a table and record protection is to be used to provide control of rows in the table.

7. A method comprising:
installing, by one or more processors, a base software package having one or more custom metadata types, wherein the base software package includes computer-executable code that, when executed by the one or more processors, causes the one or more processors to perform one or more tasks that comprise at least accessing fields of the one or more custom metadata types;
accessing, by the one or more processors, one or more protected fields, wherein, for the one or more protected fields, code in the base software package to read the one or more protected fields in the base software package and to return the accessed fields of the one or more custom metadata types whether protected or not, and if an extension software package contains additional fields within the one or more custom metadata types in the base software package, code in the base software package also to read the one or more protected fields in the extension software package and to return the accessed fields of the one or more custom metadata types whether protected or not, and wherein the extension software package is allowed to change values in protected fields within the one or more custom metadata types in the extension software package, but the extension software package is not allowed to change values in fields within the one or more custom metadata types in the base software package; and
returning, by the one or more processors, information stored in the one or more protected fields that have been accessed.

8. The method of claim 7 wherein the base software package is installed in a subscriber organization that is separate from an originating organization providing the base software package.

9. The method of claim 8 wherein the subscriber organization and the originating organization are both tenants within a single multitenant environment.

10. The method of claim 7 wherein the information stored in the one or more protected fields comprises an application program interface (API) key.

11. The method of claim 10 wherein protection for the API key is based on a subscription status.

12. The method of claim 7 wherein field editability is to be used to provide control of columns in a table and record protection is to be used to provide control of rows in the table.

13. A system comprising:

at least one memory; and one or more processors coupled with the at least one memory, the one or more processors configurable to install, by one or more processors, a base software package having one or more custom metadata types, wherein the base software package includes computer-executable code that, when executed by the one or more processors, causes the one or more processors to perform one or more tasks that comprise at least accessing fields of the one or more custom metadata types, to access, by the one or more processors, one or more protected fields, wherein, for the one or more protected fields, code in the base software package to read the one or more protected fields in the base software package and to return the accessed fields of the one or more custom metadata types whether protected or not, and if an extension software package contains additional fields within the one or more custom metadata types in the base software package, code in the base software package also to read the one or more protected fields in the extension software package and to return the accessed fields of the one or more custom metadata types whether protected or not, and wherein the extension software package is allowed to change values in protected fields within the one or more custom metadata types in the extension software package, but the extension software package is not allowed to change values in fields within the one or more custom metadata types in the base software package, and to return, by the one or more processors, information stored in the one or more protected fields that have been accessed.

14. The system of claim 13 wherein the base software package is installed in a subscriber organization that is separate from an originating organization providing the base software package.

15. The system of claim 14 wherein the subscriber organization and the originating organization are both tenants within a single multitenant environment.

16. The system of claim 13 wherein the information stored in the one or more protected fields comprises an application program interface (API) key.

17. The system of claim 16 wherein protection for the API key is based on a subscription status.

18. The system of claim 13 wherein field editability is to be used to provide control of columns in a table and record protection is to be used to provide control of rows in the table.

* * * * *